United States Patent
Fujii et al.

Patent Number: 5,476,006
Date of Patent: Dec. 19, 1995

[54] CRYSTAL EVALUATION APPARATUS AND CRYSTAL EVALUATION METHOD

[75] Inventors: Shingi Fujii, Osaka; Genshu Fuse, Toyonaka; Morio Inoue, Ibaraki, all of Japan

[73] Assignee: Matsushita Electronics Corporation, Osaka, Japan

[21] Appl. No.: 88,243

[22] Filed: Jul. 7, 1993

[30] Foreign Application Priority Data

Jul. 7, 1992 [JP] Japan ................... 4-179639

[51] Int. Cl.⁶ .................. G01B 5/28; H01J 37/28; G01N 27/00
[52] U.S. Cl. .................. 73/105; 250/306; 250/307
[58] Field of Search .................. 73/105; 250/306, 250/307, 423 F; 156/626; 436/4; 437/8

[56] References Cited

U.S. PATENT DOCUMENTS

| | | | |
|---|---|---|---|
| 4,841,148 | 6/1989 | Lyding | 250/307 |
| 4,868,396 | 9/1989 | Lindsay | 250/306 |
| 4,935,634 | 6/1990 | Hansma et al. | 250/306 |
| 4,969,978 | 11/1990 | Tomita et al. | 250/306 |
| 5,047,637 | 9/1991 | Toda | 73/105 |
| 5,120,959 | 6/1992 | Tomita | 250/307 |
| 5,202,004 | 4/1993 | Kwak et al. | 250/306 |
| 5,268,573 | 12/1993 | Weiss et al. | 250/307 |
| 5,281,814 | 1/1994 | Weiss et al. | 250/307 |
| 5,319,960 | 6/1994 | Gamble et al. | 73/105 |

*Primary Examiner*—Richard Chilcot
*Assistant Examiner*—George M. Dombroske
*Attorney, Agent, or Firm*—Rogers & Wells

[57] ABSTRACT

Crystal evaluation apparatus is disclosed which includes a cell region having an anode and a cathode, a reservoir tank for supplying of an aqueous solution for forming an anodic oxide film in the cell region, a reservoir tank for supplying of an aqueous solution for removing the anodic oxide film and a scanning microprobe microscope having a scanning microprobe, installed inside the cell region. A crystal evaluation method is also disclosed which contains anodic oxidation on a semiconductor substrate, removal of an anodic oxide film developed. The semiconductor substrate is observed with a scanning probe microscope having a scanning microprobe. The oxide film is formed on the semiconductor substrate by the anodic oxidation method and then removed by a mixture of hydrofluoric acid and ammonium fluoride. The anodic oxidation method exerts no or little physical impact on the substrate. The hydrofluoric acid and ammonium fluoride mixture removes selectively only the oxide film so that secondary ion implantation defects are exposed to a surface of the substrate. The shape or configuration of the secondary ion implantation defects is observed with an atomic force microscope having a high resolution on the order of nano meter. Therefore, the shape of the defects on the order of nano meter may be observed. In addition, the distribution of impurity concentration over the surface of the substrate may be measured very accurately.

16 Claims, 14 Drawing Sheets

AFM image

CRYSTAL EVALUATION APPARATUS AND CRYSTAL EVALUATION METHOD

BACKGROUND OF THE INVENTION

1. Field of the Invention

The present invention relates to crystal evaluation apparatus and crystal evaluation method for use in the manufacture of semiconductor devices.

2. Description of the Related Art

Ion implantation, one of techniques of introducing an impurity in the industry of semiconductor devices manufacturing, is widely used thanks of accurate control of the dose of the impurity. The ion implantation technique is one by which an impurity element is ionized and a desired ion seed is selected with mass spectrograph and accelerated with a desired acceleration energy to implant the impurity on a semiconductor substrate into a desired amount of dose at the desired acceleration energy, thereby forming an impurity layer of a desired conductive type and conductivity through heat treatments at a desired temperature and time. Amorphous layers and defective layers developed during ion implantation (particularly called "primary implantation defects") are cured through the heat treatments. It is, however, difficult to restore perfect crystal form through the heat treatments so that turbulence in crystal structure (particularly called "secondary implantation defects") remain over the semiconductor substrate even after the heat treatments. One way of evaluating such secondary implantation defects is to utilize selective wet etching to emphasize the defects and observe the same with an optical microscope or scanning electron microscope as a device of observation and another way is to observe the defects directly with a transmitting electron microscope (TEM). Further, another way was developed by which a scanning tunneling microscope (STM), one of scanning probe microscopes, is used to observe the defects at surfaces. One of such an example is I. H. Wilson et al: Physical Review B Vol. 38, No. 12 pp. 8444–8450 (1988-II) which discusses ways of observing the tracks of primary defects through which ion implantation atoms pass at a surface of a silicon substrate, after removal of an oxide layer in a silicon/oxide structure developed by ion implantation.

The following discusses methods of measuring the dopant concentration distribution over the impurity layer. Accelerated ions are caused to collide with measuring specimen and cut a surface of the measuring specimen. A secondary ion mass spectrography (SIMS) is used wherein atoms and molecules sputtering from the surface of the specimen are ionized (secondary ions) to determine the secondary ions with the mass spectrography. Recently, another way of evaluating (surface analysis) an impurity introduction layer was reported by T. Takigami et al: Applied Physics Letters, Vol. 58, pp. 2288–2290; Taking advantage of the property that the speed of wet etching is different depending upon the dose of the impurity introduced, this method transforms variation in the impurity concentration into variation in three-dimensional topographic form which in turn is measured with a scanning tunneling microscope having a space resolution on the order of nano meter ($10^{-9}$m).

Of the defect evaluation methods as discussed above, the method of utilizing wet etching would not be able to know directly the microscopic structures of the defects themselves, because the magnitude of the defects is too emphasized. The crystal defect evaluation method using the transmitting electron microscope would not observe the defects present only at the surface, because it observes the defects through a region of the specimen having a thickness of 30 to 300 nm. Moreover, the transmitting electron microscope suffers from variations from the original crystalline form because physical damages such as argon sputter are done in preparing the specimen. Although the STM evaluation method may achieve observation with a high resolution on the order of atoms, the measuring surface is limited to a surface of the specimen and the specimen should be an electrically conductive material. Another evaluation method using an atomic force microscope (AFM) does not need electrically conductive specimen but may achieve nothing more than surface evaluation like the STM method.

With the advance in technology toward finer-scale silicon devices, precise measurement of the impurity concentration (surface analysis) on the order of nano meter is needed. For instance, when the impurity concentration distribution over the source and drain regions (an impurity introduction layer) of a MOS type transistor is measured, the measuring area is less than 300 $nm^2$ and the impurity concentration ranges from $10^{16}$ to $10^{20}$ $cm^{-3}$. The conventional SIMS method known as impurity analysis method may make surface analysis. However, this method has the disadvantage that the diameter of ion beams may not be reduced as much as possible due to the need to enhance measuring sensitivity and the space resolution is thus as low as about 500 nm. When the scanning tunneling microscope and wet etching are used in combination, measurement with high resolution on the order of nano meter is possible but the measuring specimen should be electrically conductive. Another problem with such combination is that etching speed may vary with even slight variation in the mixing ratio of a wet etchant and temperature difference to impair reproducibility, because the impurity concentration distribution is transformed into a three-dimensional topographic form through the use of wet etching.

With the above discussed problems in mind, the present invention is to provide crystal defect evaluation apparatus which is capable of observing the shape of defects directly with a high resolution on the order of atoms without affecting crystal form, whether measuring specimen are electrically conductive or whatever conductivity the specimen has.

Another object of the present invention is to provide an impurity distribution measuring method having a high resolution on the order of nano meter and excellent reproducibility.

SUMMARY OF THE INVENTION

To solve the above discussed problems, the present invention provides crystal evaluation apparatus which measures force of repulsion between a probe installed on a cantilever and measuring material, with laser light incident on the cantilever and reflecting from the cantilever and a display of the state of the measuring material is provided as an image.

The measuring material is placed inside a cell region where the above measurement and a desired treatment are carried out continuously.

The crystal evaluation apparatus comprises a cell region including an anode and a cathode, a device for supplying of an aqueous solution for forming an anodic oxide film in the cell region, a device for supplying of an aqueous solution for removing the anodic oxide film and a scanning microprobe microscope having a scanning microprobe, installed inside the cell region.

The scanning probe microscope comprises an atomic force microscope.

There is provided a device inside the cell region for illuminating the cell region with light.

There is further provided a device in the cell region for temperature adjustment.

There is further provided a device in the cell region for generating ultrasonic waves.

To solve the above discussed problems, the present invention provides a crystal evaluation method which comprises the steps of carrying anodic oxidation on a semiconductor substrate and removing an anodic oxide film developed and observing the semiconductor substrate with a scanning probe microscope having a scanning microprobe.

By the above mentioned observing step, the state of defects present in the semiconductor substrate is observed.

In addition, by the above mentioned observing step, the distribution of the impurity concentration over the semiconductor substrate is observed.

The scanning probe microscope with a scanning microprobe comprises an atomic force microscope.

According to the crystal evaluation apparatus of the present invention, secondary implantation defects (referred to as an example of implantation defects hereinafter) are exposed after the oxide film is developed by anodic oxidation and then removed by a mixed solution of hydrofluoric acid and ammonium fluoride ($HF:NH_4F=1:10$). An atomic force microscope having a high resolution on the order of atoms is used to observe the shape of the secondary implantation defects, making it possible to observe the shape of the defects on the order of atoms. It is noted that no or little thermal influence is seen on the substrate because the anodic oxidation may be accomplished at room temperature. It is further noted that the hydrofluoric acid and ammonium fluoride mixture removes selectively only the oxide film without exerting thermal impact. The growth speed of the anodic oxide film is as low as 2.5 nm/min but preferable from a practical point of view to be higher in order to observe actual defect shapes.

To this end, the growth speed of the anodic oxide film may be increased by increasing current flowing between the anode and cathode. If such means is used to enhance the growth speed of the oxide layer on a surface of the semiconductor substrate, the accompanying heat of reaction would cause uneven temperature distribution and thus uneven development of the oxide film. For this reason, there is provided, the temperature adjustment device at the back of the semiconductor substrate or the device for generating the ultrasonic waves in the solution and making the temperature distribution even.

According to the above discussed method of the present invention, the oxide film is developed at a cleavage plane (silicon) of the semiconductor substrate by anodic oxidation and then removed by the mixed solution of hydrofluoric acid and ammonium fluoride. The thickness of the anodic oxide film developed is proportional to the concentration of an impurity introduced, because the growth rate of the anodic oxide film is dependent upon the concentration of the impurity introduced. The anodic oxidation method does not influence the distribution of the concentration of the impurity introduced, because it may produce the oxide film at room temperature. The hydrofluoric acid and ammonium fluoride mixture removes selectively only the oxide film. As a result, the cleavage plane of the silicon substrate is recessed or retreated in proportion to the concentration of the impurity introduced. The distribution of the concentration of the impurity introduced may be observed on the order of nano meter by observing the shape of the retreated cleavage plane of the silicon substrate with the atomic force microscope having a high resolution on the order of nano meter.

Additional features of the present invention are described in relation to the description of the preferred embodiments of the present invention.

DETAILED DESCRIPTION OF PREFERRED EMBODIMENTS OF THE INVENTION

Figure 1:
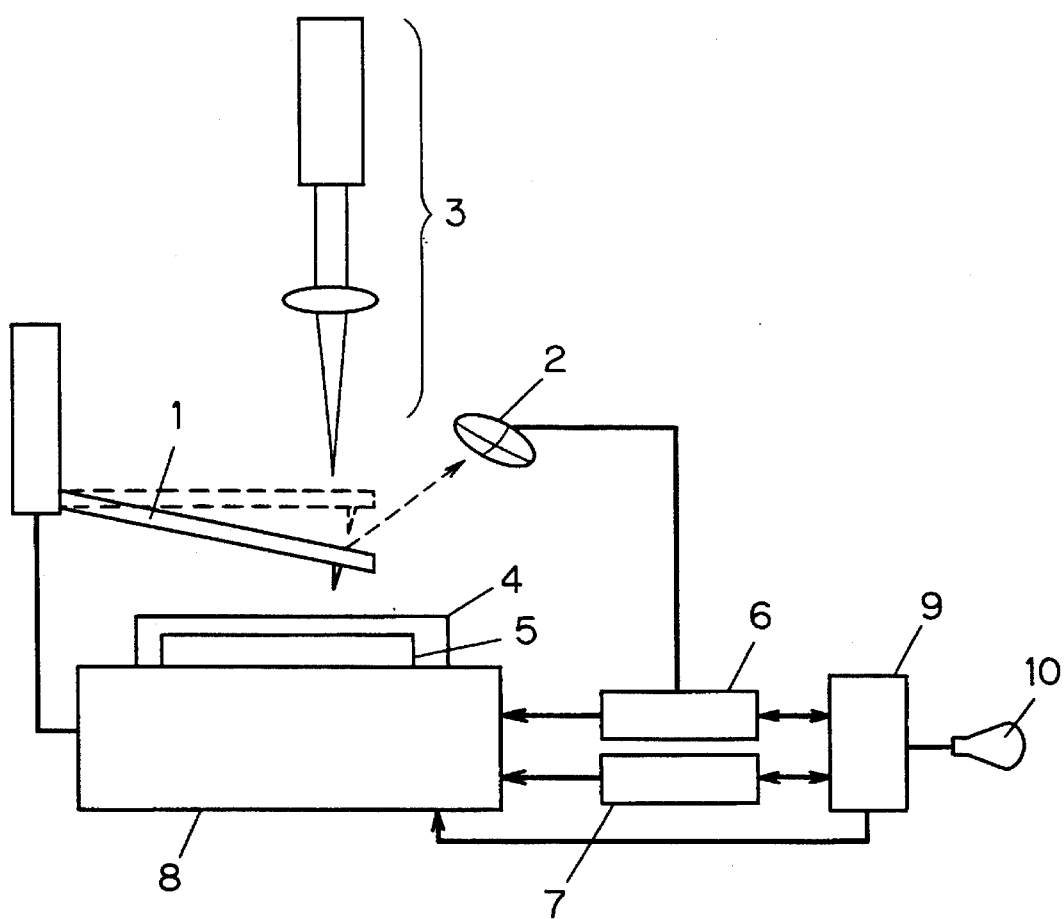
FIG. 1 is a schematic diagram of crystal evaluation apparatus according to a first embodiment of the present invention.

FIG. 1 is a schematic diagram of crystal evaluation apparatus according to a first embodiment of the present invention.

A method for observing secondary implantation defects of a specimen for measurement with an atomic force microscope as shown in FIG. 1 will be described below. Major components of the atomic force microscope are a cantilever 1 having a probe of a small radius of curvature and a displacement measuring system 2 including a plurality of photo diodes for measuring the bent of the cantilever 1. In general, where there are two substances, a force of attraction is exerted on the two substances when they are at a remote or long distance. A force of repulsion is exerted on the two substances when they are at a close or short distance. The force of repulsion is very sensitive to variation in the distance between the substances. By transforming such variation in the force of repulsion into the amount of displacement or bent of the cantilever 1, it is possible to observe the force of repulsion. The amount of such displacement is sensed by the displacement measuring system 2 which senses laser light generating from a laser light generator 3 toward the cantilever 1 and reflected from the cantilever 1. With such reflected light, the bent of the cantilever 1 is measured. An XYZ drive system 8 is enabled in scanning directions by a Z-axis control signal system 6 and an X-Y scanning signal control system 7, the Z-axis control signal system keeping constant the height of the tip of the probe installed inside a cell region 4 and that of the measuring specimen 5 and the X-Y scanning signal control system 7 controlling the X-axis and Y-axis positions of the measuring specimen 5. Three-dimensional images on a surface of the measuring specimen 5 may be obtained by sensing light signals while under three-axis control. The three-dimensional images are signal processed by a microcomputer 9 and displayed on an image display 10.

The crystal evaluation apparatus of the present invention is advantageous over the prior art defects observing method with the transmitting electron microscope in that it may provide direct observation of images of defects without damaging crystal form. Another advantage of the present invention is that its observation area is wider than that obtained by the transmitting electron microscope. The crystal evaluation apparatus of the present invention is further capable of monitoring the three-dimensional structures of the secondary ion implantation defects by carrying out the development of the anodic oxide film, the removal of the anodic oxide film and the image observation in continuous manner and particularly observing the defects while maintaining the positional relationship between the probe and a surface of the specimen. Still another advantage of the present invention is that it takes much shorter time to observe the defects.

Although the above illustrated embodiment of the present invention observes the measuring specimen 5 mounted in the cell region 1, it is obvious to those skilled in the art that the measuring specimen 5 may be disposed directly on a top of the XYZ drive system 8 to carry out similar observation when it is not necessary to carry out the anode oxide treatments continuously. However, in particular, when measurements are to be carried out continuously with the treatments, it is desirable to use the cell region as depicted in FIG. 2.

Moreover, whereas the atomic force microscope (AFM) is used in the above illustrated embodiment, a scanning probe microscope having a scanning probe (for example, scanning tunneling microscope (STM)) may be utilized depending upon the measuring subject.

Figure 2:
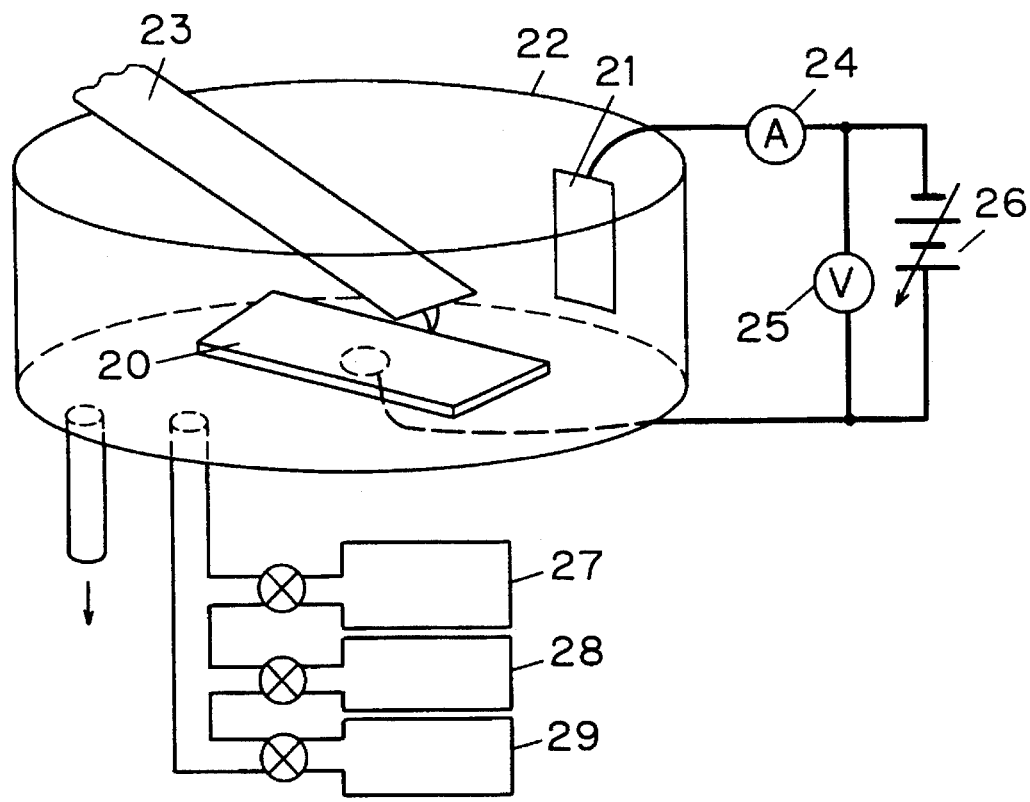
FIG. 2 is an illustration of an anodic oxidation cell structure of the crystal evaluation apparatus according to its first embodiment.

Referring to FIG. 2, a first embodiment of the cell region in the evaluation apparatus will be discussed in detail. A cell 22 is structured into a cylindrical shape with an open top surface. The cell 22 of a capacity of 2 ml is provided at the bottom thereof with reservoir tanks 27, 28 and 29 via valves for supplying of solutions for anodic oxidation. A drain pipe is also connected to discharge the solutions from the cell 22 after anodic oxidation. The reservoir tank 27 maintains a mixed solution of N-Methylacetamide, potassium oxalate (KNO$_3$) and water (H$_2$O). The mixed solution, for example, contains 300 cc of N-Methylacetamide, 1.2 g of potassium oxalate and 4.5 cc of water. The reservoir tank 28 keeps a mixture of hydrofluoric acid and ammonium fluoride (HF:NH$_4$F=1:10), whereas the reservoir tank 29 maintains pure water. Wirings are attached to the measuring specimen via a waterproof seal from the bottom of the cell 22. A cathode 21 of platinum is fixed on a side wall of the cell 22. A constant voltage/constant current source 26 is connected between the measuring specimen 20 and the cathode 21. The constant voltage/constant current source 26 used is one having ratings of output voltage ranging from 0 to 360 V and output current ranging from 0 to 220 mA, for example. A voltage meter 25 is connected in parallel with the constant voltage/constant current source 26 and a current meter 24 in series with the same.

The measuring specimen 20 is treated in advance as follows. A silicon substrate used is a silicon substrate with a plane orientation of <100> and a resistivity of 10–15 Ω.cm. A thermal oxide film is grown thereon to a thickness of 100 nm. Boron ions are implanted through this film at an acceleration energy of 50 keV and a dose of 3×10$^{14}$ cm$^{-2}$. The ion implantation is followed by heat treatments at a temperature of 900° C. and a period of 10 sec. Thereafter, the thermal oxidation film is removed by hydrofluoric acid. Through the above treatments, the secondary implantation defects are developed at a depth of 120 nm from a top surface of the silicon substrate.

It is obvious that whereas the silicon substrate is used as substrate material, other semiconductor substrates or conductors may be used alternatively. However, similar advantages are not expected when the semiconductor substrate is intrinsic semiconductor or insulator.

In the above illustrated embodiment, conductivity should be 10$^{-8}$ S/cm or more. The reason why the thermal oxide film is developed prior to the ion implantation is to prevent the surface of the substrate from becoming rough during the ion implantation process or contaminated with foreign subjects.

During the ion implantation process an impurity in the oxide film may sometimes be driven in (knock on) the substrate in the case of specimens used for this sort of analysis. To this end, the purity of thermal oxide film is a problem. Therefore, a thermal oxide layer which is developed as a high purity oxide film with the thermal CVD method is used. A nitride film is rarely used because impact by nitrogen is unknown and its growth and removal is difficult to attain. Although in the above embodiment the thermal oxide layer is used, any type of a film which serves as a protective layer during the ion implantation process and is easy to grow and remove and assumes a high purity is applicable.

A method for forming an anodic oxide film with the anodic oxidation cell region in the above illustrated embodiment will be discussed in detail. The solution is fed into the interior of the cell 22 from the reservoir tank 27 and output current of 10 mA of the constant voltage/constant current source 26, for example, is fed. At this time, a voltage meter 25 indicates 64 V and a current meter 24 indicates 10 mA. If this situation continues without any change, the voltage readout of the voltage meter 25 would increase gradually but the constant voltage/constant current source 26 functions to keep the current amount constant at 10 mA. Once the voltage meter 25 has indicated 269 V, the circuit is shut off. When the voltage variance (final voltage value—initial voltage value) reaches 205 V, an anodic oxide film is developed on the silicon substrate to a thickness of 130 nm. The area occupied by the anodic oxide film is 1.2 cm² and the growth rate of the oxide film is 2.5 nm/min.

Then, the pure water in the reservoir tank 29 is fed to the cell 22 to clean the interior of the cell 22. After that, the hydrofluoric acid and ammonium fluoride mixture in the reservoir tank 28 is fed to the interior of the cell 22 to remove the anodic oxide film.

Figure 3:
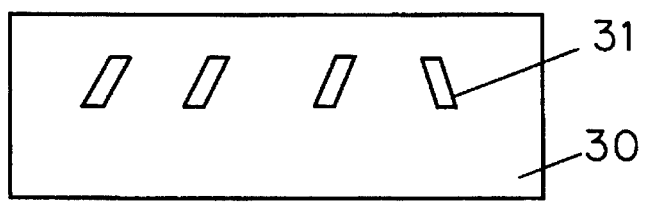
FIGS. 3(a) to 3(e) are diagram for explaining the step of exposing secondary implantation defects in the first embodiment of the present invention.
Figure 3:
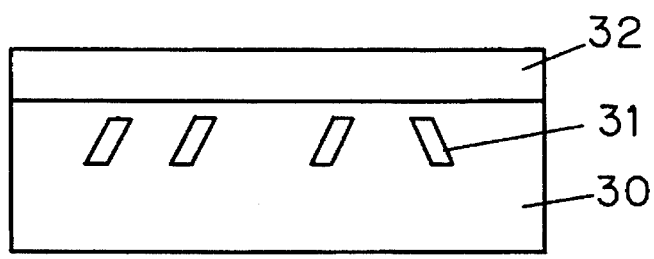
Figure 3:
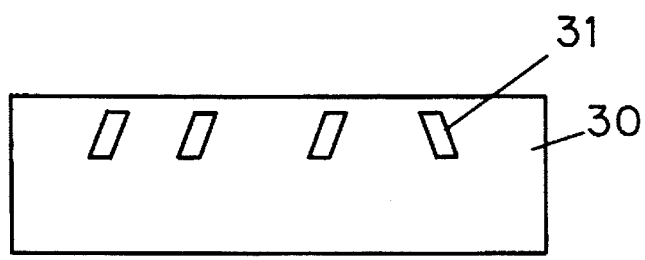
Figure 3:
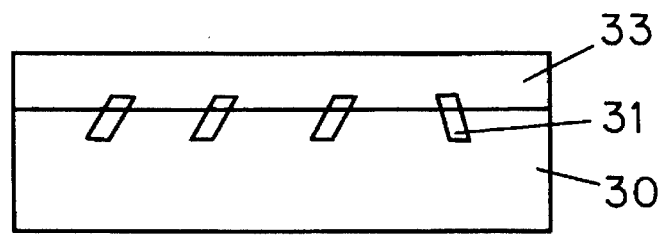
Figure 3:
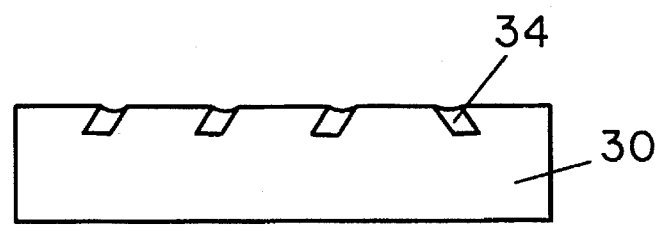

A method for observing the defects in the measuring specimen will be discussed with reference to FIGS. 3(a) to 3(e). FIG. 3(a) shows secondary ion implantation defects present at a depth of 120 nm from the top surface of a silicon substrate 30 as developed from the above method. FIG. 3(b) shows the growth of an anodic oxide film 32 on the silicon substrate at a depth of 130 nm according to the anodic oxidation method as illustrated in FIG. 2. The anodic oxide film 32 is grown while consuming silicon from the underlying silicon substrate 30. The amount of the silicon consumed equals 0.45 times the thickness of anodic oxide film. In other words, the silicon substrate 30 is consumed by 58.5 nm. FIG. 3(c) shows the situation where the anodic oxide film 32 grown as in FIG. 3(b) is removed by the hydrofluoric acid and ammonium fluoride mixture. At this time, the silicon substrate 30 is retreated or cut 58.5 nm from the original top surface. FIG. 3(d) shows growth of another anodic oxide film 33 to a thickness of 130 nm as in FIG. 3(b). FIG. 3(e) shows removal of the anodic oxide film 33 as in FIG. 3(c). At this moment, the silicon substrate 30 is retreated 58.5 nm as compared with the situation of FIG. 3(c). In this manner, the anodic oxidation and etching are performed twice so that the silicon substrate 30 is retreated a total of 117 nm. Since the secondary ion implantation defects are present at a depth of 120 nm, the defects 34 are exposed to the top surface of the silicon substrate 30 through the anodic oxidation and etching twice. Whereas the anodic oxidation and etching are repeated twice in the above illustrated embodiment, the two treatments may be effected more than twice if the defects are present at a deeper depth from the surface of the silicon substrate.

Figure 4:
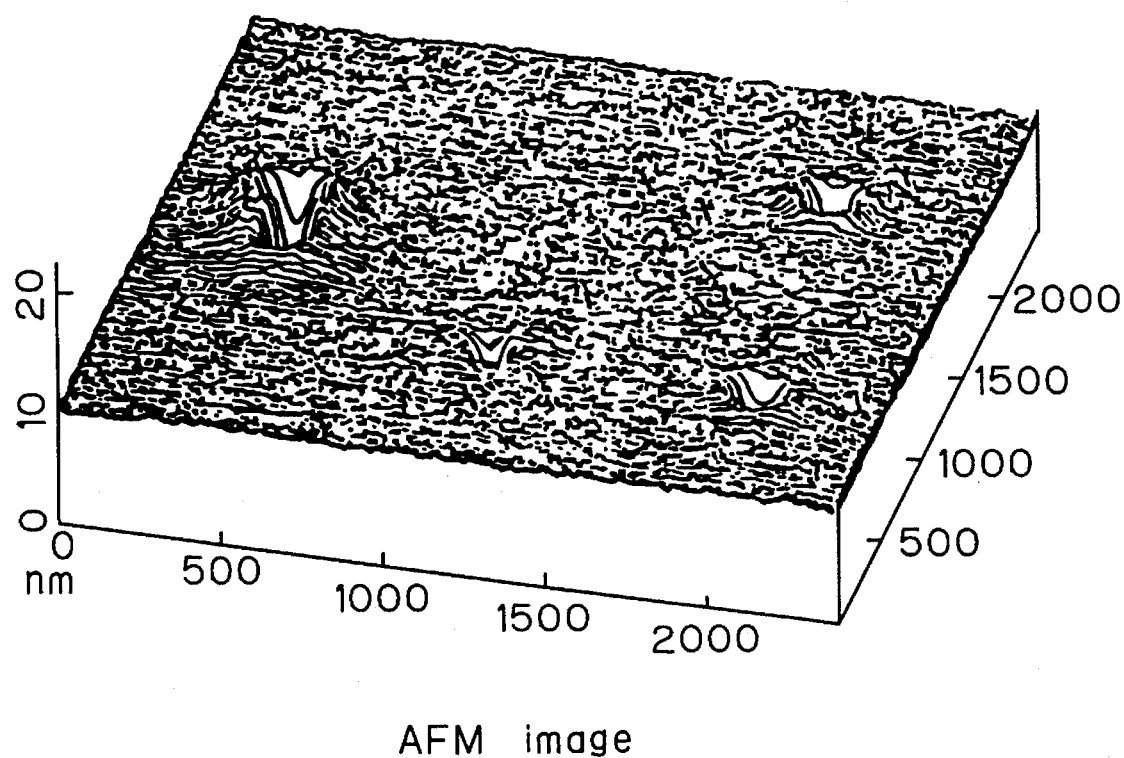
FIG. 4 is a diagram showing observation results according to the first embodiment of the present invention.

FIG. 4 illustrates an exemplary observation result in the above illustrated embodiment. Three-dimensional image outputs from the observation results in FIG. 1 are depicted. Four crater-shaped defects are seen in the surface of the silicon substrate. These are the secondary ion implantation defects. The crater-shaped defects are formed when the anodic oxide film crosses the secondary ion implantation defects region as seen from FIGS. 3(a) to 3(e).

The crystal evaluation apparatus and method of the present invention may directly observe the defects under the condition where they are exposed to the surface of the silicon substrate, instead of observing the defects through the specimen as with the conventional transmitting electron microscope. For this reason, the defects induced during the ion implantation process may be observed in a state close to the actual condition according to the present invention.

Figure 5:
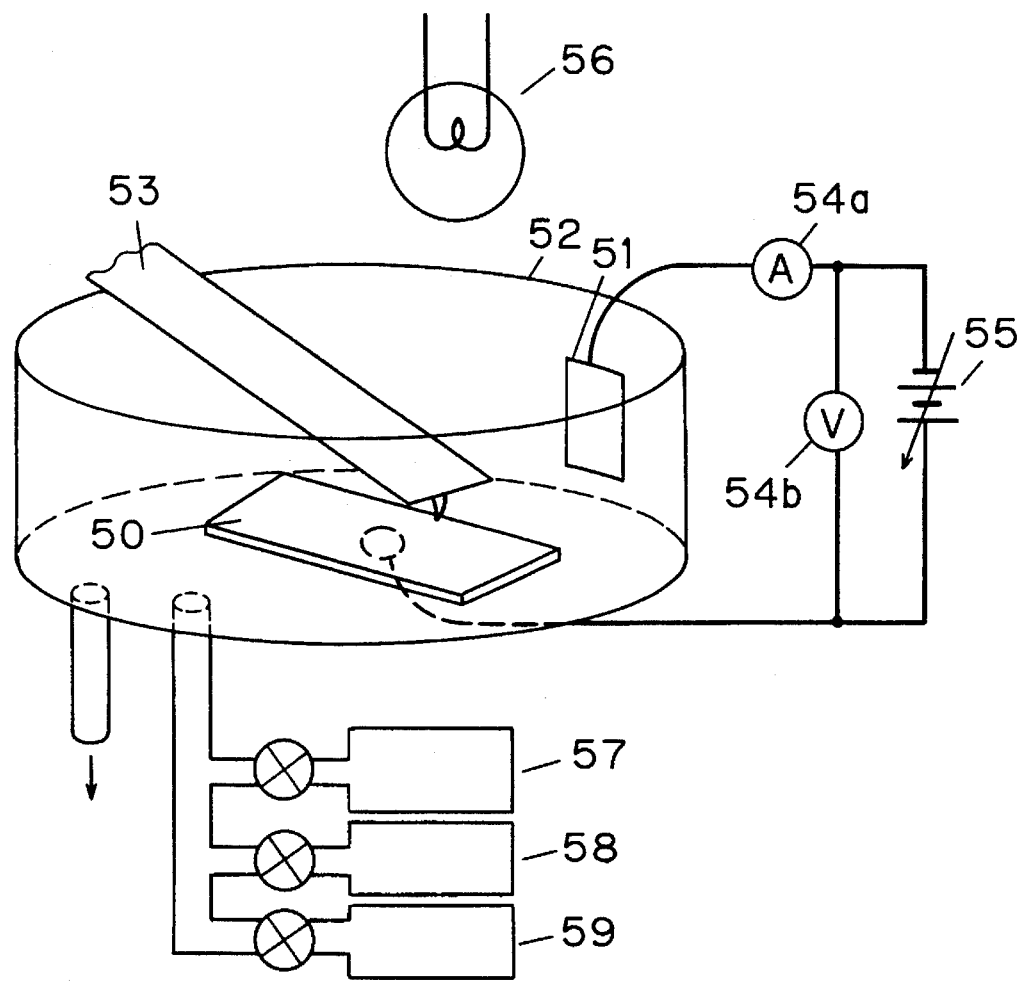
FIG. 5 is a diagram of an anodic oxidation cell structure of the crystal evaluation apparatus according to its second embodiment.

FIG. 5 is a schematic diagram of an anodic oxidation cell according to a second embodiment. The anodic oxidation cell of FIG. 5 is similar to the first embodiment except for the use of a power 500 W white light source (for example, high pressure mercury vapor lamp (DC 250 W)) for illumination from top of a cell 52. With the illustrated arrangement, a solution of N-Methylacetamide, potassium oxalate and water is fed from a reservoir tank 57 to the interior of the anodic oxidation cell 52. For example, if the output current of a constant voltage/constant current source 55 is set at 10 mA, then a voltage meter 54b indicates 73 V and a current meter 54a indicates 10 mA. When oxidation is carried out under illumination with white light from the white light source 56, the voltage readout of the voltage meter 54b increases gradually. The constant voltage/constant current source 55 functions to keep the current amount constant at 10 mA. Once the voltage meter 54b has indicated 273 V, the circuit is shut off. When the voltage variance reaches 200 V, an anodic oxide film is developed on the silicon substrate to a thickness of 170 nm. The growth rate of the oxide film at this time is 3.4 nm/min.

As noted earlier, the second embodiment increases the growth rate of the anodic oxide film by 0.9 nm/min as compared with the first embodiment, without deteriorating uniformity of the thickness or film quality of the oxide film due to uneven temperature distribution caused by heat of reaction when the growth of the thermal oxide film is speeded up.

Figure 6:
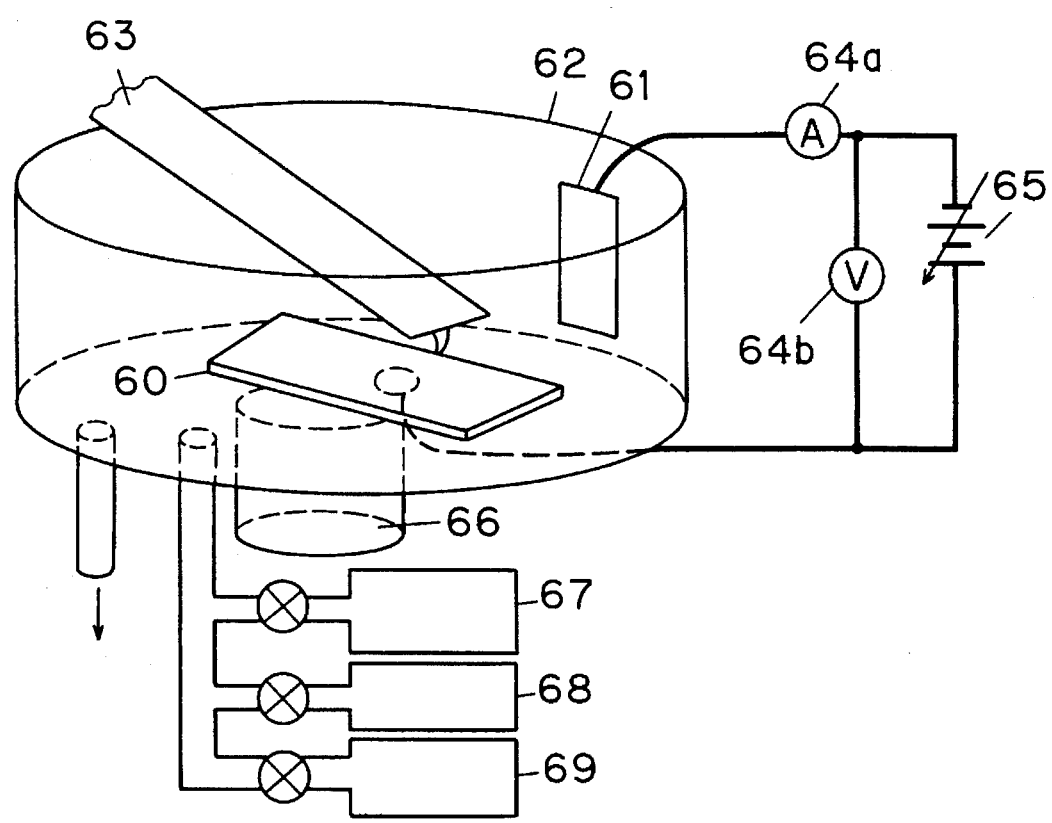
FIG. 6 is a diagram of an anodic oxidation cell structure of the crystal evaluation apparatus according to its third embodiment.

FIG. 6 is a diagram showing a third embodiment of the anodic oxidation cell.

The first embodiment experiences heat of reaction and uneven thickness and quality of the anodic oxide film when the current flow increases to 20 mA in order to enhance the growth rate of the oxide film by the anodic oxidation method. The cell structure of the third embodiment provides a solution to those problems.

The third embodiment of FIG. 6 is different from the first embodiment in that a temperature adjustment device 66 including a water cooling means and an electric heater is provided at the bottom of the cell 62 where a measuring specimen 60 is secured. The device increases the current flow and thus the growth rate of the anodic oxide film.

Within the anodic oxidation cell of FIG. 6, an aqueous solution is fed from a reservoir tank 67 to the interior of the anodic oxidation cell 62. For example, if the output current of a constant voltage/constant current source 65 is set at 20 mA, then a voltage meter 64b indicates 114 V and a current meter 64a indicates 20 mA. When this condition is permitted to continue, the voltage readout of the voltage meter 64b increases gradually. The constant voltage/constant current source 65 functions to keep the current amount constant at 20 mA. At this moment, the temperature adjustment device 66 makes temperature adjustment in order to keep the back of the measuring specimen at 20° C. Once the voltage meter 64b has indicated 314 V, the circuit is shut off. When the voltage variance reaches 200 V, an anodic oxide film is developed on the silicon substrate to a thickness of 200 nm. The growth rate of the oxide film at this time is 4.0 nm/min.

As understood earlier, the third embodiment increases the growth rate of the anodic oxide film by 1.5 nm/min as compared with the first embodiment, without deteriorating uniformity of the thickness or film quality of the oxide film due to uneven temperature distribution caused by heat of reaction when the growth of the thermal oxide film is speeded up.

Figure 7:
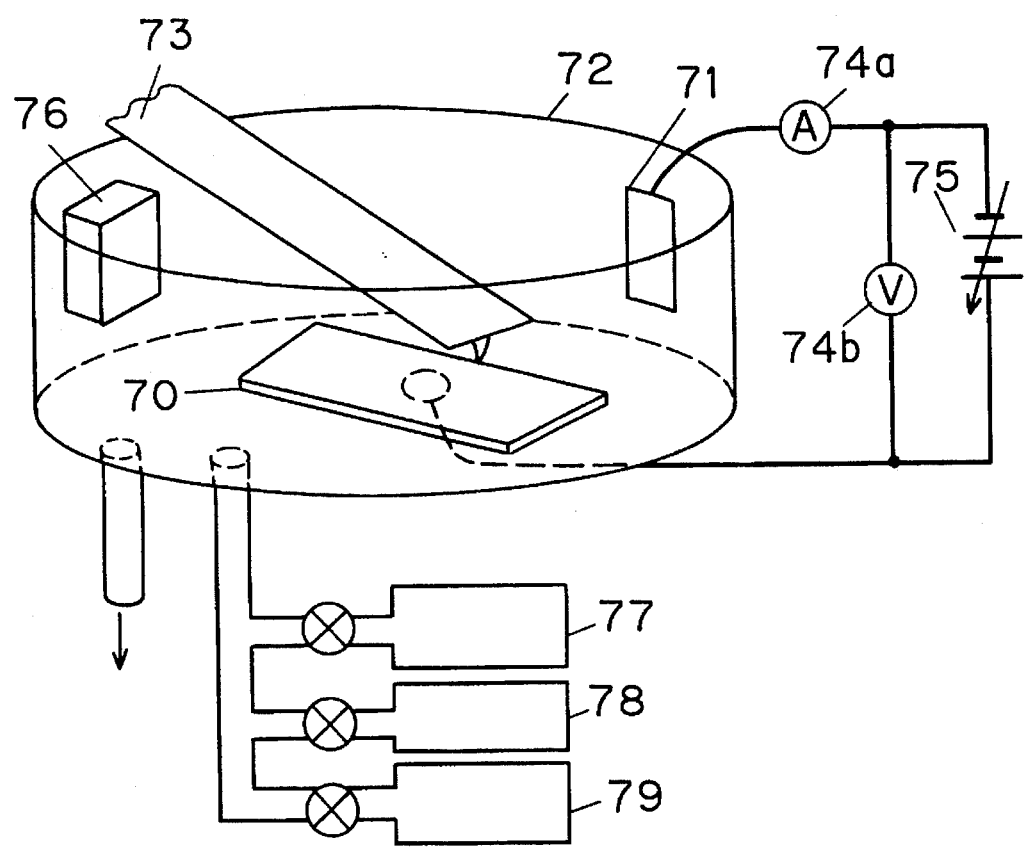
FIG. 7 is a diagram of an anodic oxidation cell structure of the crystal evaluation apparatus according to its fourth embodiment.

FIG. 7 is a diagram showing a fourth embodiment of the anodic oxidation cell.

The first embodiment experiences heat of reaction and uneven thickness and quality of the anodic oxide film when the current flow increases to 20 mA in order to enhance the growth rate of the oxide film by the anodic oxidation method. The cell structure of the fourth embodiment provides another solution to those problems.

The fourth embodiment is different from the first embodiment in that an ultrasonic vibrator 76 of an oscillating frequency of 26 kHz is provided at a side wall of a cell 72. The ultrasonic vibrator 76 prevents temperature rise at a surface of a measuring specimen 70.

Within the anodic oxidation cell of FIG. 7, an aqueous solution is fed from a reservoir tank 77 to the interior of the anodic oxidation cell 72. For example, if the output current of a constant voltage/constant current source 75 is set at 20 mA, then a voltage meter 74b indicates 114 V and a current meter 74a indicates 20 mA. When this condition is permitted to continue, the voltage readout of the voltage meter 74b increases gradually. The constant voltage/constant current source 75 functions to keep the current amount constant at 20 mA. Local temperature rise on a surface of the specimen is prevented by giving vibration to the aqueous solution adjacent to the surface of the specimen through the ultrasonic vibrator 76. Once the voltage meter 74b has indicated 314 V, the circuit is shut off. When the voltage variance reaches 200 V, an anodic oxide film developed on the silicon substrate is 200 nm thick. The growth rate of the oxide film at this time is 4.0 nm/min.

As noted earlier, the fourth embodiment increases the growth rate of the anodic oxide film by 1.5 nm/min as compared with the first embodiment, without deteriorating uniformity of the thickness or film quality of the oxide film due to uneven temperature distribution caused by heat of reaction when the growth of the thermal oxide film is speeded up.

Figure 8:
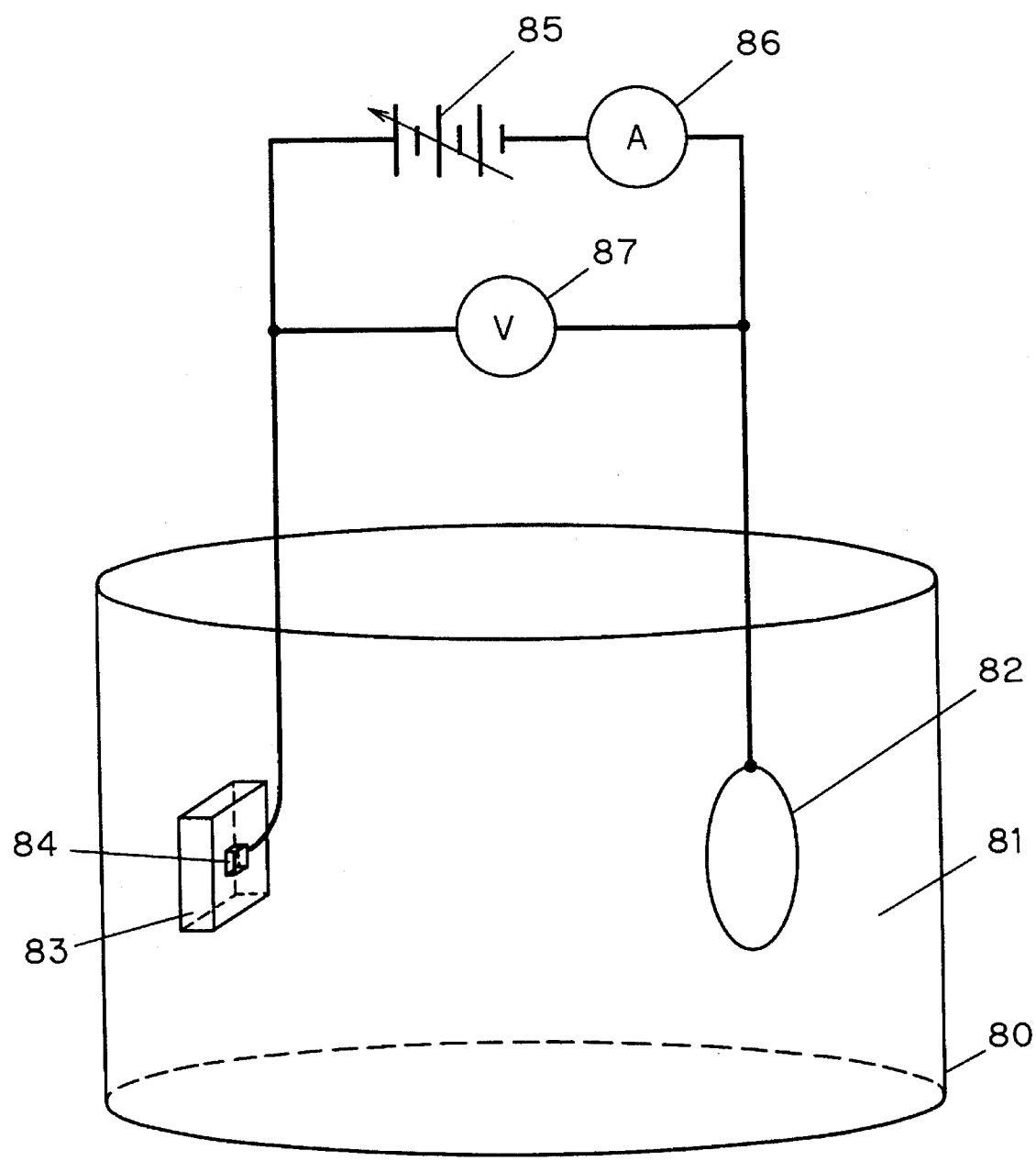
FIG. 8 is a diagram showing an anodic oxidation device used for a method for measuring the distribution of the concentration of an impurity introduced according to the present invention.

FIG. 8 is a diagram showing an anodic oxidation device for carrying out anodic oxidation according to a fifth embodiment of the present invention.

A glass beaker 80 of 500 cc is of a cylindrical shape with an open top surface. The beaker 80 is filled with a mixed solution which contains 300 cc of N-Methylacetamide, 1.2 g of potassium oxalate and 4.5 cc of water. Within the solution, there is formed a circuit including a counter electrode (cathode) 82 of platinum and a specimen 84 (anode) for measuring impurity dose distribution as embedded in epoxy resin 83. The reason why the specimen 84 is embedded in the epoxy resin 83 is the need to immerse only a fracture plane of a substrate into the aqueous solution in this embodiment in order to measure impurity distribution at a cleavage plane of the substrate. When the secondary defects are to be observed as in the first through fourth embodiments, it is necessary to etch the surface of the substrate. To this end, the silicon substrate may be immersed as the anode as it is. A serial circuit of a constant voltage/constant current source 85 and a current meter 86 is connected between the anode and cathode. A voltage meter 87 is connected in parallel with the serial circuit. The constant voltage/constant current source 85 used has an output ranging from 0 to 360 V and an output current ranging from 0 to 220 mA.

The specimen 84 is prepared as follows. At an acceleration energy of 80 keV and a dose of $3 \times 10^{14}$ cm$^{-2}$, phosphorus ions are implanted on a silicon substrate with P type, a plane orientation of <100> and a resistivity of 10–15 Ω.cm. The silicon substrate is subjected to heat treatments at 900° C. and for 30 min. to form a field effect transistor (FET) having an impurity region. The substrate or specimen 84 is then cleaved to expose the impurity region. The substrate is embedded in the epoxy resin 83 in such a manner as to expose the cleavage plane. The cleavage plane of the silicon substrate or the specimen 84 serves as the anode during the anodic oxide film growth process. The area of the cleavage plane exposed as the anode in the electrolytic solution is 6 mm$^2$.

Within the anodic oxidation device of FIG. 8, for example, if the output current of a constant voltage/constant current source 85 is set at 0.5 mA (8.3 mA/cm$^2$), then a voltage meter 87 indicates 3.1 V and a current meter 86 indicates 0.5 mA. When this condition is permitted to continue, the voltage readout of the voltage meter 87 increases gradually and the current readout of the current meter 86 decreases gradually. The constant voltage/constant current source 85 operates to keep the current amount constant at 0.5 mA. Once the voltage meter 87 has indicated 5.0 V, the circuit is shut off. When the voltage variance reaches 1.9 V, an anodic oxide film developed on the cleavage plane of the P type silicon substrate not including the impurity region of the field effect transistor is 50 nm thick. It takes 40 minutes and the growth rate of the anodic oxide film at this time is 1.25 nm/min. The growth rate of the anodic oxide film may be controlled accurately by maintaining the current constant.

Referring to FIGS. 9(a) to 9(d), there are illustrated steps of implementing a retreat in a silicon substrate in proportion to impurity distribution through the use of anodic oxidation and wet etching with hydrofluoric acid.

Figure 9:
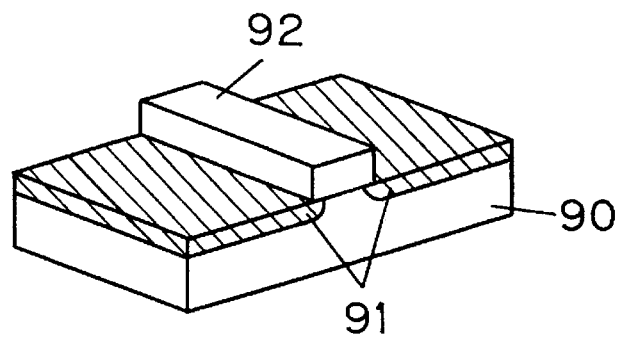
FIGS. 9(a) to 9(d) are diagrams for explaining the step of providing a retreat in a silicon substrate in proportion to the impurity concentration distribution.
Figure 9:
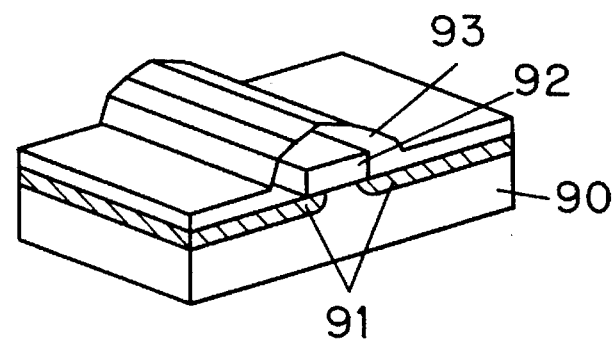
Figure 9:
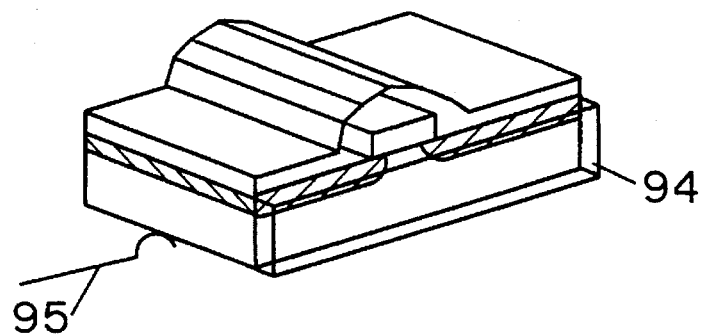
Figure 9:
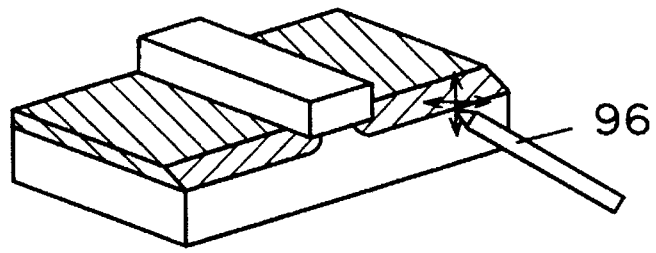

FIG. 9(a) shows a cleavage plane of a field effect transistor having impurity introduction layers 91 on a P type silicon substrate 90 by phosphorus ion implantation. A gate electrode 92 having a gate width of 3.0 μm is disposed on the silicon substrate 90 between the impurity introduction layers 91. In FIG. 9(b), an SOG (Spin on Glass) film 93 is applied to a thickness of 0.5 μm to the P type silicon substrate 90 to prevent an anodic oxide film from growing from a surface of the P type silicon substrate, and the cleavage plane is then formed in a specimen. Under the circumstance, the cleavage plane of the specimen is exposed and embedded in epoxy resin. As seen from FIG. 9(c), contact is made with a contact electrode 95 disposed at the back of the silicon substrate 90 so that an anodic oxide film 94 of 50 nm thick is grown. In the illustrated embodiment, contact is made with the back of the silicon substrate 90 having the cleavage plane. In this instance, since the substrate is P type and the impurity introduction layers 91 are N type, bias is seen in forward direction between the silicon substrate 90 and the impurity introduction layers 91, making it possible to apply a voltage to the impurity introduction layers 91. It is also easy to make contact with the back of the silicon substrate 90. FIG. 9(d) shows measurements of the cleavage plane with the atomic force microscope after the anodic oxide film 94 of 50 nm thickness is removed with the mixture of hydrofluoric acid and ammonium fluoride (HF:NH$_4$F=1:10). In FIG. 9(d), since the thickness of the anodic oxide film 94 grown is proportional to the dose of the impurity, the silicon substrate 90 is retreated in proportion to the dose of the impurity if the anodic oxide film 94 is removed. The amount of retreat is very small on the order of 6 nm with the highest concentration of the impurity in the specimen in the illustrated embodiment or $1 \times 10^{-21}$ cm$^{-3}$. Should the atomic force microscope for practical and commercial use be employed, a sufficient resolution of 0.1 μm in height direction is assured for a scanning region of 75 μm×75 μm. For this reason, it is possible to measure the amount of retreat in the silicon substrate 90 in proportion to the dose of the impurity.

Figure 10:
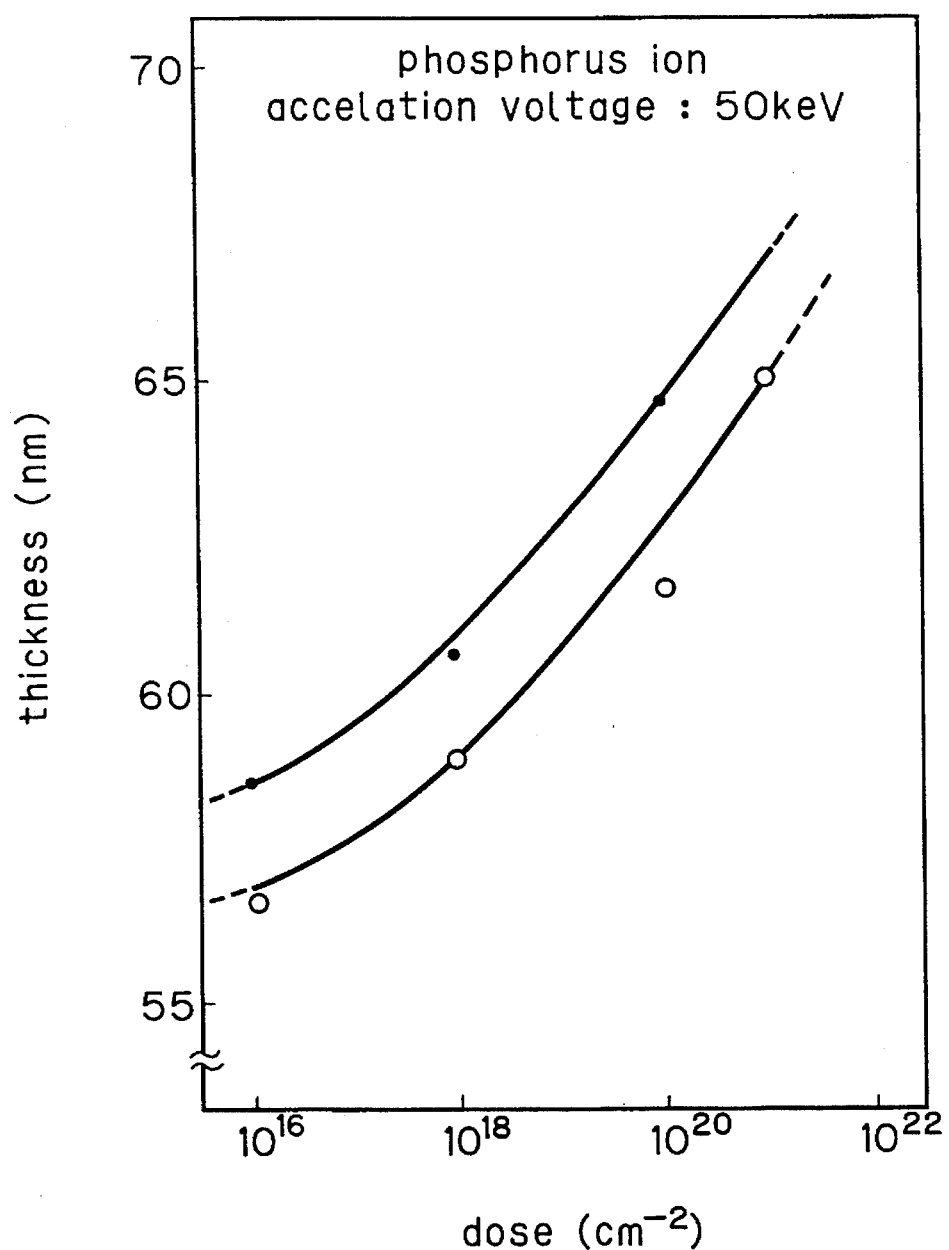
FIG. 10 illustrates the relationship between the thickness of an anodic oxide film and a dose of an impurity.
Figure 11:
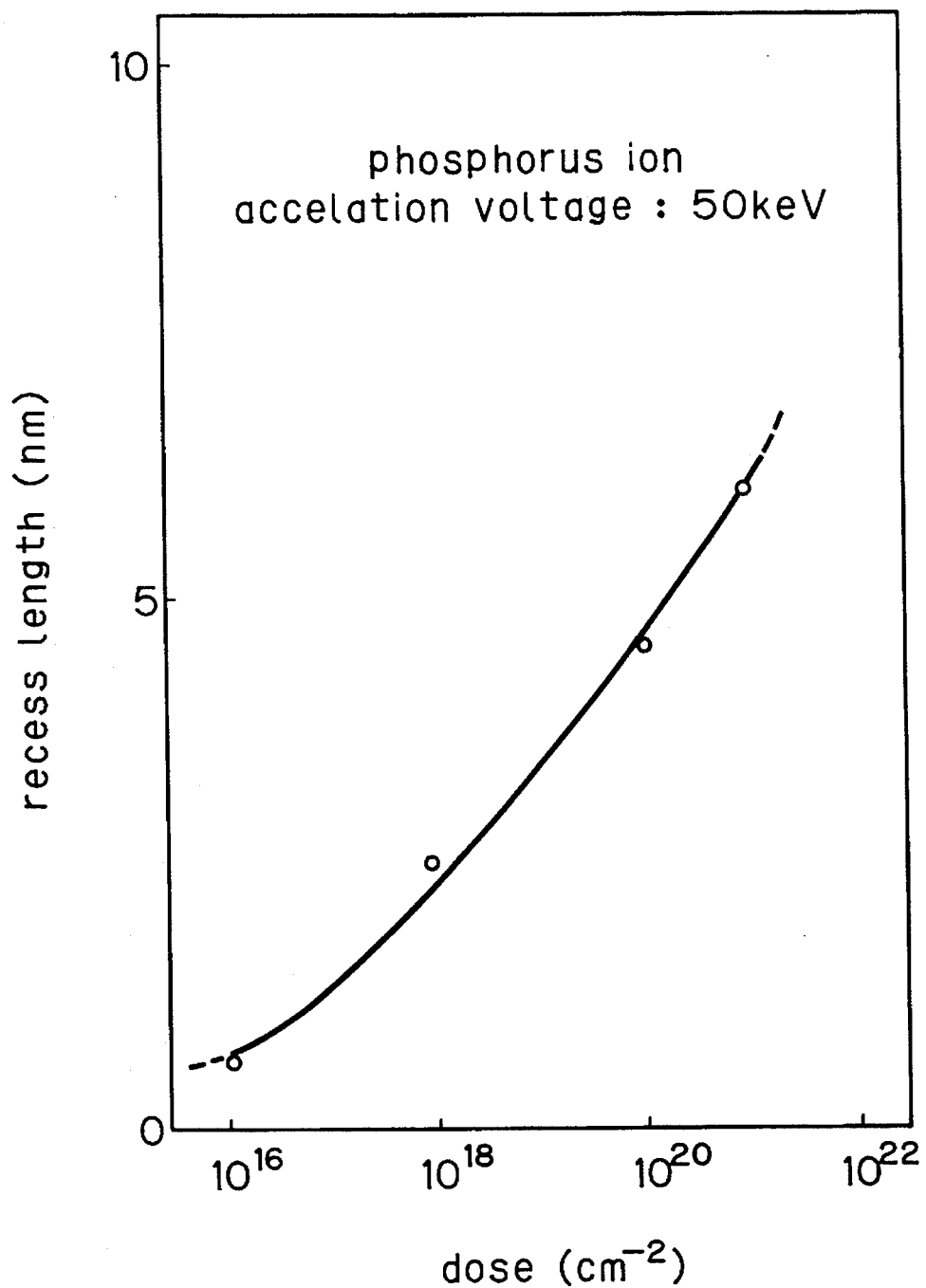
FIG. 11 illustrates the relationship between the amount of a retreat in the silicon substrate and the impurity dose.

FIGS. 10 and 11 illustrate the dependency of the thickness of the anodic oxide film upon the dose of the impurity and the dependency of the length of recess or retreat in the silicon substrate upon the dose of the impurity after removal of the anodic oxide film, respectively. SIMS is used for impurity concentration measurements. The abscissa is plotted with the dose of ions and the ordinate with the thickness of the anodic oxide film. It is evident that the thickness of the anodic oxide film increases with increase in the dose of ion implantation. Variation in the thickness of the anodic oxide film is plotted by the black dots in FIG. 10 when a high pressure mercury vapor lamp (DC 250 W) is used for illumination at a distance of 30 cm. With such light illumination, the thickness of the anodic oxide film may be increased to thereby shorten the time for specimen preparation. It is clear from FIG. 11 that the length of retreat in the silicon substrate increases in proportion to the dose of ion implantation.

Figure 12:
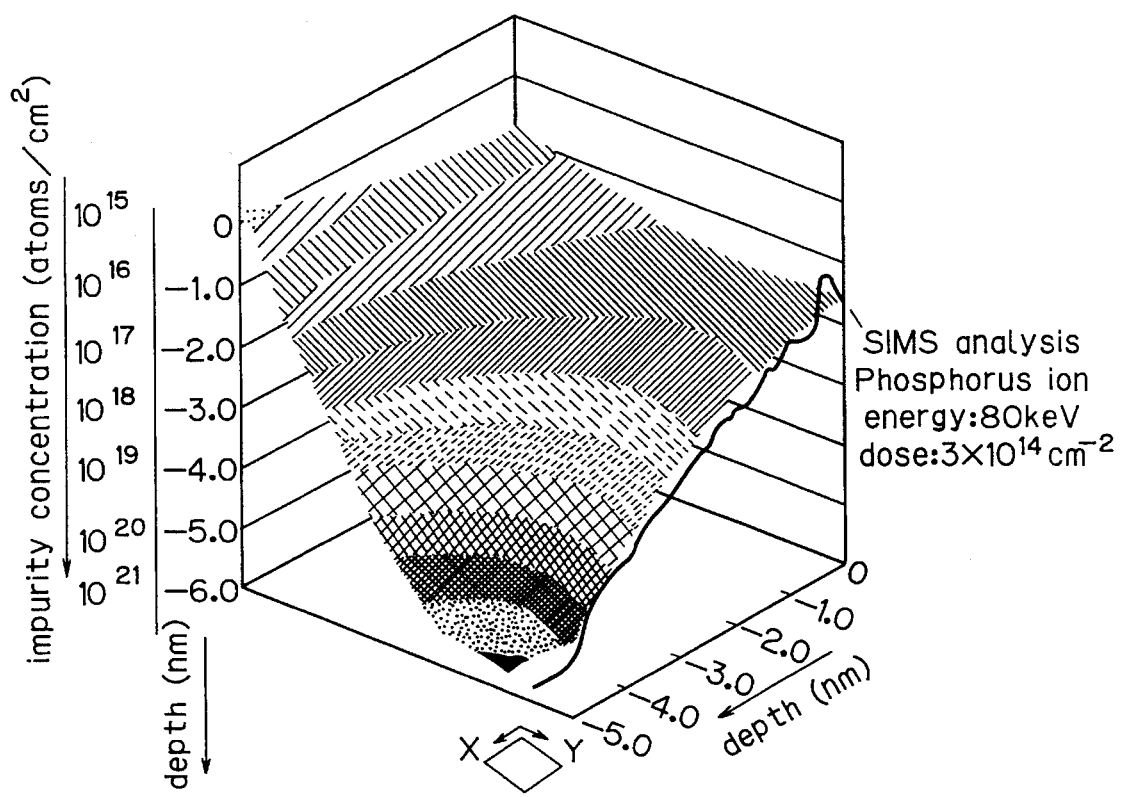
FIG. 12 illustrates observation results according to the impurity concentration distribution measuring method of the present invention.
Figure 13:
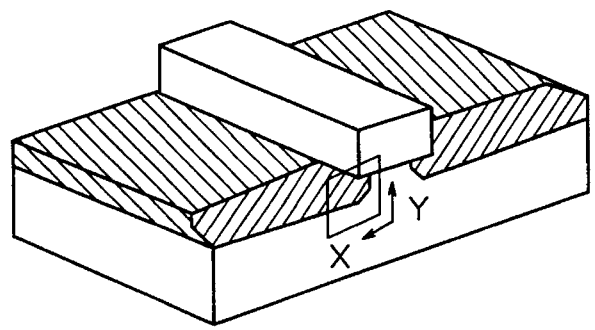
FIG. 13 is a diagram showing points of observation in the impurity concentration distribution measuring method.

FIG. 12 shows an exemplary observation result in the first embodiment of the present invention. FIG. 13 shows a cross sectional view of a field effect type transistor. FIG. 12 is a three-dimensional display of impurity concentration measurements in □ in FIG. 13. FIG. 12 shows the retreat in the silicon substrate by the anodic oxidation and hydrofluoric acid etching, which retreat is proportional to the dose of the impurity introduced. The results of analysis of the impurity distribution with SIMS analysis are depicted by the solid lines in FIG. 12. By bringing the impurity concentration distribution as analyzed with SIMS analysis into correspondence with the length of retreat in the silicon substrate, it becomes evident that the retreat of 1 nm in the silicon substrate substantially equals 10 times as great as variation in the impurity concentration distribution as analyzed with SIMS analysis.

Where the secondary implantation defects are seen in the impurity layers during heat treatments, depressions are observed in correspondence with the amplitude and density of the secondary implantation defects. Since the secondary implantation defects are exposed subsequent to the anodic accompanied, with no entailing heat treatments and the removal of the oxide film with hydrofluoric acid, the secondary implantation defects may be evaluated from the amplitude and density thereof.

Figure 14:
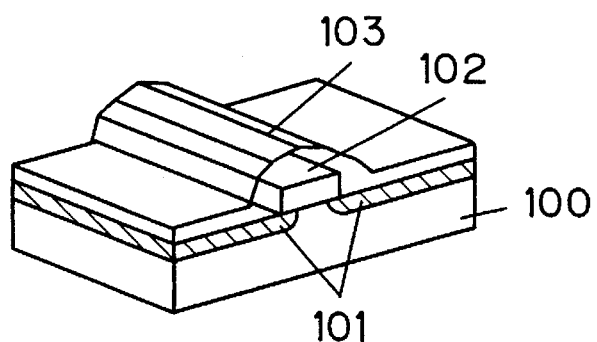
FIGS. 14(a) to 14(c) are diagrams for explaining the step of providing a retreat in the silicon substrate in proportion to the impurity concentration distribution.
Figure 14:
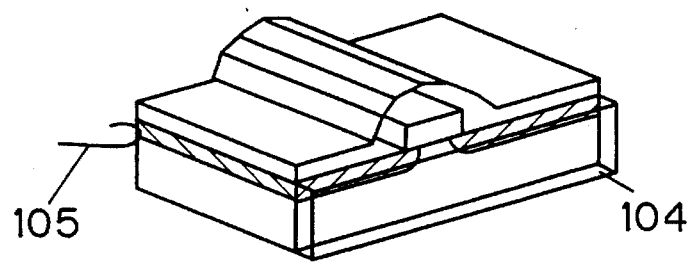
Figure 14:
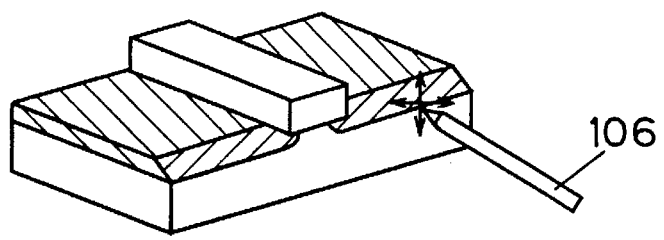

FIGS. 14(a) to 14(c) illustrate steps of implementing a retreat in a silicon substrate in proportion to impurity distribution through the use of anodic oxidation and wet etching with hydrofluoric acid.

An N type silicon substrate 100 has a plane orientation of <100> and a resistivity of 5–10 Ω.cm. Impurity introduction layers 101 serving a source and drain are formed in the silicon substrate 100. At an acceleration energy of 35 keV and a dose of $3 \times 10^{14}$ cm$^{-2}$, boron ions are implanted on the silicon substrate. The silicon substrate is subjected to heat treatments at 900° C. and for 30 min. to form the impurity introduction layers 101. A gate electrode 102 having a gate width of 3.0 μm is disposed on the silicon substrate 100, which is covered with an SOG film 103 of a thickness of 0.5 μm. A field effect transistor is formed in this manner. The SOG (Spin on Glass) film 63 is provided to prevent an anodic oxide film from growing from a surface of the silicon substrate 100. The transistor element with the above structure is cleaved (FIG. 14(a)).

As seen from FIG. 14(b), an anodic oxide film 104 is formed to a thickness of 50 nm while only the impurity introduction layers 101 are used as an anode for anodic oxidation. In the illustrated example, the silicon substrate 100 is of N type and the impurity introduction layers 101 are of P type so that a bias is seen in reverse direction between the silicon substrate 100 and the impurity introduction layers 101, making it impossible to apply a voltage to the impurity introduction layers 101 via the silicon substrate 100. For this reason, advantages similar to those of the first embodiment contact are not made available unless contact is made only with the impurity introduction layers 101, while a contact electrode 105 is used as anode. It is noted that the contact electrode 105 may be disposed at another location as long as it is electrically connected to the impurity introduction layers 101.

FIG. 14(c) shows measurements of the cleavage plane with the atomic force microscope after an anodic oxide film 104 of 50 nm thickness is removed with the mixture of hydrofluoric acid and ammonium fluoride (HF:NH$_4$F=1:10). Since the thickness of the anodic oxide film 104 grown is proportional to the dose of the impurity, the silicon substrate 100 is retreated in proportion to the dose of the impurity if the anodic oxide film 104 is removed. High accuracy measurements of impurity concentration distribution are made possible through repeated performance of the above steps and simultaneous measurements.

Figure 15:
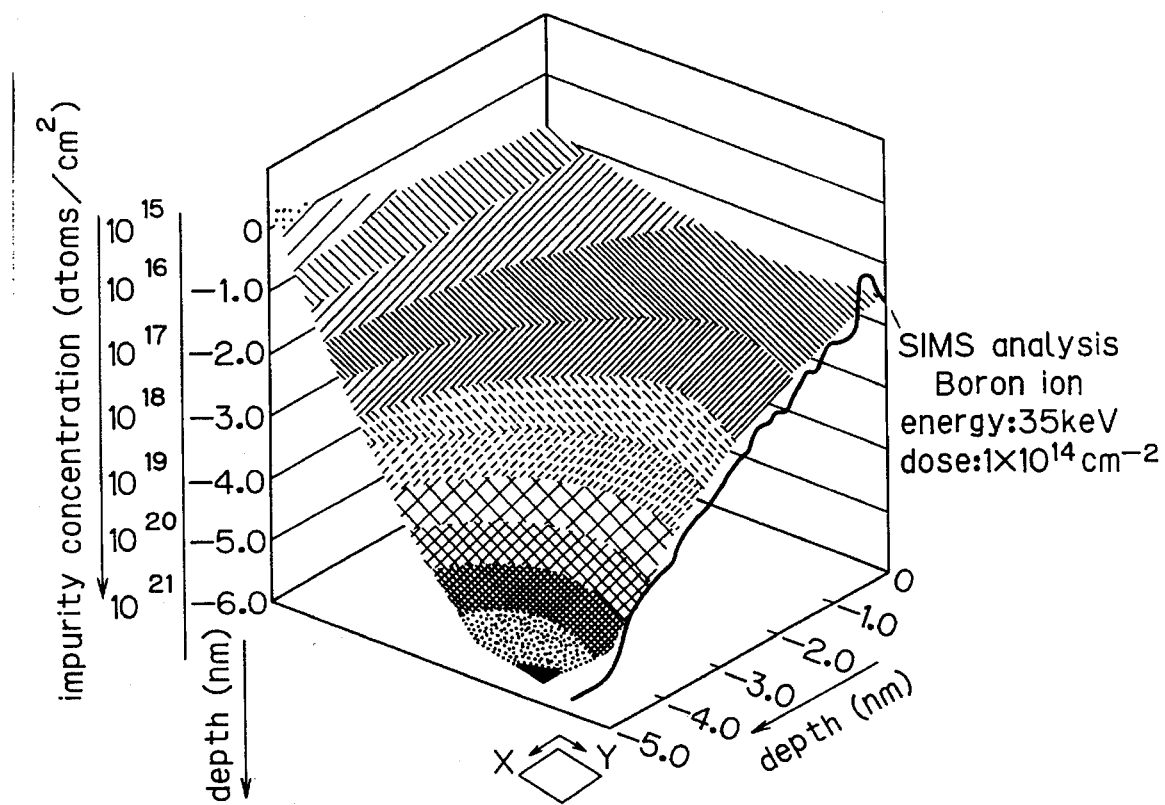
FIG. 15 illustrates observation results according to the impurity concentration distribution measuring method of the present invention.
Figure 16:
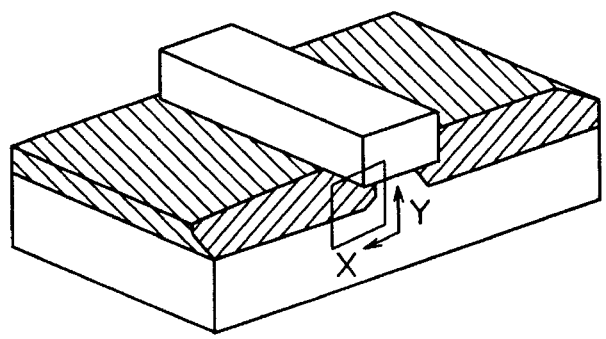
FIG. 16 is a diagram showing points of observation in the impurity concentration distribution measuring method.

FIG. 15 shows an exemplary observation result in the method according to the embodiment of FIGS. 14(a) to 14(c). FIG. 15 is a three-dimensional display of impurity concentration measurements in □ in FIG. 16 which is a cross sectional view of a field effect transistor. FIG. 15 shows the retreat in the silicon substrate by the anodic oxidation and hydrofluoric acid etching, which retreat is proportional to the dose of the impurity introduced.

As discussed above, even when a reverse bias appearing between the impurity introduction layers covered with the anodic oxide film and the silicon substrate makes it difficult to apply an effective electric field, such electric field may be applied.

Whereas the atomic force microscope (AFM) is used in the above illustrated embodiments, a scanning probe microscope having a scanning probe (for example, scanning tunneling microscope (STM)) may be utilized depending upon the measuring subject.

It is also obvious to those skilled in the art that the mixed solution of N-Methylacetamide, potassium oxalate and water is used as the anodic oxidizing solution but other mixed solutions may be used alternatively. The above illustrated embodiments apply to the silicon substrates but may apply to other materials (for example, compound semiconductors).

The crystal evaluation apparatus according to the present invention provides an observation area wider than that available from the conventional transmitting electron microscope. Another advantage of the present invention is that three-dimensional structures of the secondary ion implantation defects may be monitored by continuous operation of the anodic oxide film formation, the removal of the anodic oxide film and the image observation. These advantages are beneficial to the semiconductor industry. The present invention makes it possible to control accurately the growth rate of the anodic oxide film and measure the impurity distribution with a high resolution on the order of nano meter and excellent reproducibility, by maintaining constant the current amount for forming the anodic oxide film in transforming the impurity concentration distribution into variations in three-dimensional shape. Measurements of the impurity concentration distribution in nano meter fine areas, which were considered impossible with the conventional secondary ion mass spectrography (SIMS), are made possible by the present invention and provide significant advantages in the industry.

While preferred embodiments have been described, various modifications and substitutions may be made without departing from the spirit and scope of the invention. Therefore. it is understood that the present invention has been described by way of illustration and not limitation and the spirit and scope of the claims should not be limited to the description of the preferred embodiments.

What is claimed is:

1. Crystal evaluation apparatus for evaluating defects at a deep position in a semiconductor device comprising:

(a) anodic oxide film forming cell region including the semiconductor device as an anode and a cathode, (b) a first solution supply device for forming an anodic oxide film on a surface of the semiconductor device in the cell region by supplying a first aqueous solution, (c) a second solution supply device for removing the anodic oxide film to an extent to expose the defects at a deep position in the semiconductor device, applying a second aqueous solution and (d) a scanning microscope having a scanning microprobe, installed inside the anodic oxide film forming cell region, for observing the exposed defects in the semiconductor device.

2. Crystal evaluation apparatus as set forth in claim 1 wherein the scanning probe microscope comprises an atomic force microscope.

3. Crystal evaluation apparatus as set forth in claim 1 further comprising a device for illuminating the cell region with light.

4. Crystal evaluation apparatus as set forth in claim 1 further comprising a device in the cell region for temperature adjustment.

5. Crystal evaluation apparatus comprising:

(a) a cell region including an anode and a cathode, (b) a device for supplying an aqueous solution for forming an anodic oxide film in the cell region, (c) a device for supplying an aqueous solution for removing the anodic oxide film, (d) a scanning microscope having a scanning microprobe, installed inside the cell region, and (e) a device in the cell region for generating ultrasonic waves.

6. A crystal evaluation method for evaluating defects at a deep position in a semiconductor substrate, comprising the steps of:

(a) forming an anodic oxide film on a semiconductor substrate, (b) removing the anodic oxide film developed to an extent to expose the defects at a deep position in the semiconductor substrate and (c) observing the exposed defects in the semiconductor substrate with a scanning probe microscope having a scanning microprobe.

7. A crystal evaluation method as set forth in claim 6 wherein the three-dimensional state of the defects present in the semiconductor substrate is observed during the observation step.

8. A crystal evaluation method as set forth in claim 6 wherein the distribution of the impurity concentration over the semiconductor substrate is observed during the observing step.

9. A crystal evaluation method as set forth in claim 6 wherein the scanning probe microscope with the scanning microprobe comprises an atomic force microscope.

10. A method for evaluating defects at a deep position in a semiconductor substrate, as set forth in claim 6, wherein the defects include ion implantation defects and the anode oxide film is removed to expose the ion implantation defects.

11. A crystal evaluation method as set forth in claim 6 wherein a mixture of hydrofluoric acid and ammonium fluoride is used to within a cell which contains an atomic power microscope microprobe for removing the anodic oxide film.

12. A crystal evaluation method as set forth in claim 6 wherein a mixed solution of N-Methylacetamide, potassium oxalate and water is used as an anodic oxidizing solution.

13. A crystal evaluation method as set forth in claim 6 wherein a constant current is supplied to form the anodic oxide film.

14. A method for measuring impurity concentration distribution over a semiconductor substrate having an impurity introduction layer, comprising the steps of:

(a) forming an oxide film at a cleavage plane of the semiconductor substrate so that the thickness of the oxide film developed is proportional to the concentration of an impurity introduced, (b) removing selectively only the oxide film to an extent to retreat and expose the cleavage plane of the semiconductor substrate in proportion to the concentration of the impurity introduced, and (c) observing the distribution of the concentration of the impurity introduced by observing the shape of the retreated and exposed cleavage plane of the semiconductor substrate with an atomic force microscope.

15. Crystal evaluation apparatus for evaluating defects at a deep position in a semiconductor device comprising:

(a) anodic oxide film forming cell region including the semiconductor device as an anode and a cathode, (b) a first solution supply device for forming an anodic oxide film on a surface of the semiconductor device in the cell region by supplying a first aqueous solution, (c) a second solution supply device for removing the anodic oxide film to an extent to expose the defects at a deep position in the semiconductor device, by supplying a second aqueous solution and (d) a scanning microscope having a scanning microprobe, installed inside the anodic oxide film forming cell region, wherein force of repulsion is measured between the microprobe installed on a cantilever and the semiconductor device, with laser light incident on the cantilever and reflecting from the cantilever, for observing the exposed defects in the semiconductor device, and (e) a display providing a display of the state of the semiconductor device as an three-dimensional image.

16. A crystal evaluation method for evaluating defects at a deep position in a semiconductor substrate, comprising the steps of:

(a) forming an anodic oxide film on the semiconductor substrate, (b) removing the anodic oxide film developed, (c) repeating continuously the above steps (a) and (b) to an extent to expose the defects at a deep position in the semiconductor substrate and (d) observing the exposed defects in the semiconductor substrate with a scanning probe microscope having a scanning microprobe.

* * * * *